(12) United States Patent
DeFelice et al.

(10) Patent No.: US 10,975,875 B2
(45) Date of Patent: Apr. 13, 2021

(54) PASSIVE BLEED VALVES WITH ADJUSTABLE PRESSURE THRESHOLD

(71) Applicant: Hamilton Sundstrand Corporation, Charlotte, NC (US)

(72) Inventors: Robert DeFelice, South Windsor, CT (US); Scott W. Simpson, Easthampton, MA (US); Josh Kamp, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 231 days.

(21) Appl. No.: 16/054,869

(22) Filed: Aug. 3, 2018

(65) Prior Publication Data
US 2020/0040901 A1 Feb. 6, 2020

(51) Int. Cl.
*F16K 1/12* (2006.01)
*F04D 27/02* (2006.01)
(Continued)

(52) U.S. Cl.
CPC ....... *F04D 27/0215* (2013.01); *F01D 17/105* (2013.01); *F01D 17/145* (2013.01);
(Continued)

(58) Field of Classification Search
CPC .. Y10T 137/3367; Y10T 137/353; F02C 6/08; F16K 1/12; F16K 1/126; F16K 15/026
See application file for complete search history.

(56) References Cited

U.S. PATENT DOCUMENTS 1,636,662 A * 7/1927 Lamer ................ F16K 1/126
137/222
2,608,204 A * 8/1952 Dunn ................. F16K 7/075
137/220
(Continued)

FOREIGN PATENT DOCUMENTS

EP 3056739 A1 8/2016
EP 3070336 A1 9/2016
GB 2376515 A 12/2002

OTHER PUBLICATIONS

Extended European Search Report dated Jan. 8, 2020, issued during the prosecution of European Patent Application No. EP 19189049.0.

*Primary Examiner* — Gerald L Sung
(74) *Attorney, Agent, or Firm* — Locke Lord LLP; Joshua L. Jones; Scott D. Wofsy (57) ABSTRACT

A bleed valve includes a housing with an inlet coupled to an outlet by a duct, a guide tube with an orifice fixed in the housing between the inlet and the outlet, a piston, and baffle. The piston is slideably supported on the guide tube and is movable between an open and a closed position, the duct fluidly coupling the inlet and outlet in the open position, the duct fluidly separating the inlet and outlet in the closed position. The orifice fluidly couples the inlet and outlet in the open and closed positions to move piston between the open and closed positions according to differential pressure between the bleed valve inlet and outlet. The baffle is slideably supported by the guide tube to set the differential pressure at which the piston moves between the open and closed positions. Gas turbines and differential pressure adjustment methods are also described.

16 Claims, 9 Drawing Sheets

(51) Int. Cl.
  *F01D 17/10* (2006.01)
  *F01D 17/14* (2006.01)
  *F02C 9/18* (2006.01)
  *F16K 15/02* (2006.01)
  *F02C 6/08* (2006.01)

(52) U.S. Cl.
  CPC .............. *F02C 9/18* (2013.01); *F04D 27/023* (2013.01); *F16K 1/126* (2013.01); *F16K 15/026* (2013.01); *F02C 6/08* (2013.01)

(56) References Cited

U.S. PATENT DOCUMENTS

| | | | |
|---|---|---|---|
| 2,870,779 A * | 1/1959 | Thomiszer | F16K 15/063 137/219 |
| 4,182,117 A * | 1/1980 | Exley | F02C 6/08 415/208.3 |
| 5,531,566 A | 7/1996 | Derouet et al. | |
| 6,102,017 A | 8/2000 | Bushell | |
| 6,230,734 B1 * | 5/2001 | Grebnev | F16K 1/123 137/220 |
| 7,086,841 B2 | 8/2006 | Cornwell | |
| 7,555,905 B2 | 7/2009 | Borcea | |
| 8,814,498 B2 | 8/2014 | Goodman et al. | |
| 9,784,184 B2 | 10/2017 | Marocchini et al. | |
| 2003/0205049 A1 * | 11/2003 | Anderson | F02C 3/32 60/782 |
| 2004/0261858 A1 * | 12/2004 | Ferrel | F16K 24/02 137/493.8 |
| 2007/0234738 A1 * | 10/2007 | Borcea | F04D 27/0215 60/785 |
| 2007/0284002 A1 * | 12/2007 | Hartman | F16K 3/265 137/219 |
| 2016/0273450 A1 * | 9/2016 | Marocchini | F02C 6/08 |
| 2017/0191373 A1 | 7/2017 | Miranda et al. | |

* cited by examiner

PASSIVE BLEED VALVES WITH ADJUSTABLE PRESSURE THRESHOLD

FEDERAL RESEARCH STATEMENT

This invention was made with government support with the United States Air Force under Contract No. FA8626-16-C-2139. The government has certain rights in the invention.

BACKGROUND OF THE INVENTION

1. Field of the Invention

The present disclosure relates to valves, and more particularly to inline bleed valves and methods of controlling fluid flow through bleed valves such as in gas turbine engines.

2. Description of Related Art

Gas turbine engines, such as on aircraft, commonly employ compressors. The compressor provides a flow of compressed fluid for combustion and subsequent expansion of high pressure combustion products in the engine turbine. The turbine extracts work from the expanding combustion products to provide power to the compressor during steady state operation.

During engine starting the power available from combustion products can be limited. In some engines, for purposes of limiting the work input requirement of the compressor during starting, the compressor is vented. Venting is typically accomplished by opening a bleed valve, opening the compressor at least partially open to the external environment until fluid moving through the compressor section reaches suitable pressure. Open and closure of bleed valves is generally accomplished actively, such as by energizing or de-energizing a solenoid, or other commanded device.

Such conventional methods and systems have generally been considered satisfactory for their intended purpose. However, there is still a need in the art for improved bleed valves, compressors, gas turbine engines, and methods of controlling fluid flow through a bleed valve. The present disclosure provides a solution for this need.

SUMMARY OF THE INVENTION

A bleed valve includes a housing with an inlet coupled to an outlet by a duct, a guide tube with an orifice fixed in the housing between the inlet and the outlet, a piston, and baffle. The piston is slideably supported on the guide tube and is movable between an open and a closed position, the duct fluidly coupling the inlet and outlet in the open position, the duct fluidly separating the inlet and outlet in the closed position. The orifice fluidly couples the inlet and outlet in the open and closed positions to move piston between the open and closed positions according to differential pressure between the bleed valve inlet and outlet. The baffle is slideably supported by the guide tube to set the differential pressure at which the piston moves between the open and closed positions.

In certain embodiments the baffle can extend circumferentially about an interior of the guide tube. The baffle can have a first position and a second position. Flow area of orifice can be larger in the second position than in the first position. The baffle can have a skirt portion and a face portion. The skirt portion can overlap a portion of the orifice in the first position. The face portion can of the baffle can be arranged within an interior of the guide post. The face portion can have a set pin aperture to seat a set pin in the baffle.

In accordance with certain embodiments the bleed valve can include a set pin. The set pin can movably couple the baffle to the housing for displacement of the baffle relative to the guide tube. A collar can be connected to the set pin and fix the baffle to the set pin. The set pin can have a flange arranged on the set pin adjacent the baffle and fix the baffle to the set pin. The housing can have a set pin aperture. The set pin can be received within the set pin aperture. The set pin can be free for rotation and axial movement relative to the housing for setting the differential pressure.

It is contemplated that a sleeve threadably seated in the set pin aperture. The set pin can be received within the sleeve. The set pin can be threadably coupled to the sleeve for rotation and displacement relative to sleeve when moving between the first position and the second position. The set pin can have a set pin has a tool engagement feature arranged on an end of the set pin opposite the baffle. The orifice can include a plurality of axially extending slots. The baffle can overlap the axially extending slots in at least one of the first position and the second position. The housing can have a housing orifice fluidly coupling the guide tube orifice with the bypass channel. The set pin can be arranged between guide tube orifice and the housing aperture.

A gas turbine engine includes a compressor with a plenum, a turbine operably connected to the compressor, and bleed valve as described above. The bleed valve couples the plenum with the external environment and includes a set pin movably coupling the baffle to the housing for displacement of the baffle relative to the guide tube. The set pin is threadably coupled to the housing for rotation and displacement relative to sleeve to set the differential pressure. In certain embodiments the housing can have a housing aperture fluidly coupling the guide tube orifice with the bypass channel, the set pin arranged between guide tube orifice and the housing aperture.

A method of setting differential pressure at which a bleed valve opens includes setting the differential pressure between the inlet and the outlet of the bleed valve at which the piston moves between an open position and a closed position. When the differential pressure rises above the differential pressure the piston moves to the closed position such that the duct fluidly separates the inlet from the outlet. When the differential pressure drops blow above the differential pressure the piston moves to the open position such that the duct fluidly couples the inlet to the outlet.

In certain embodiments movement between the open position and the closed position can be passive. Setting the differential pressure can include rotating a set pin connecting the baffle to the housing. Setting the differential pressure can include changing flow area of the orifice.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
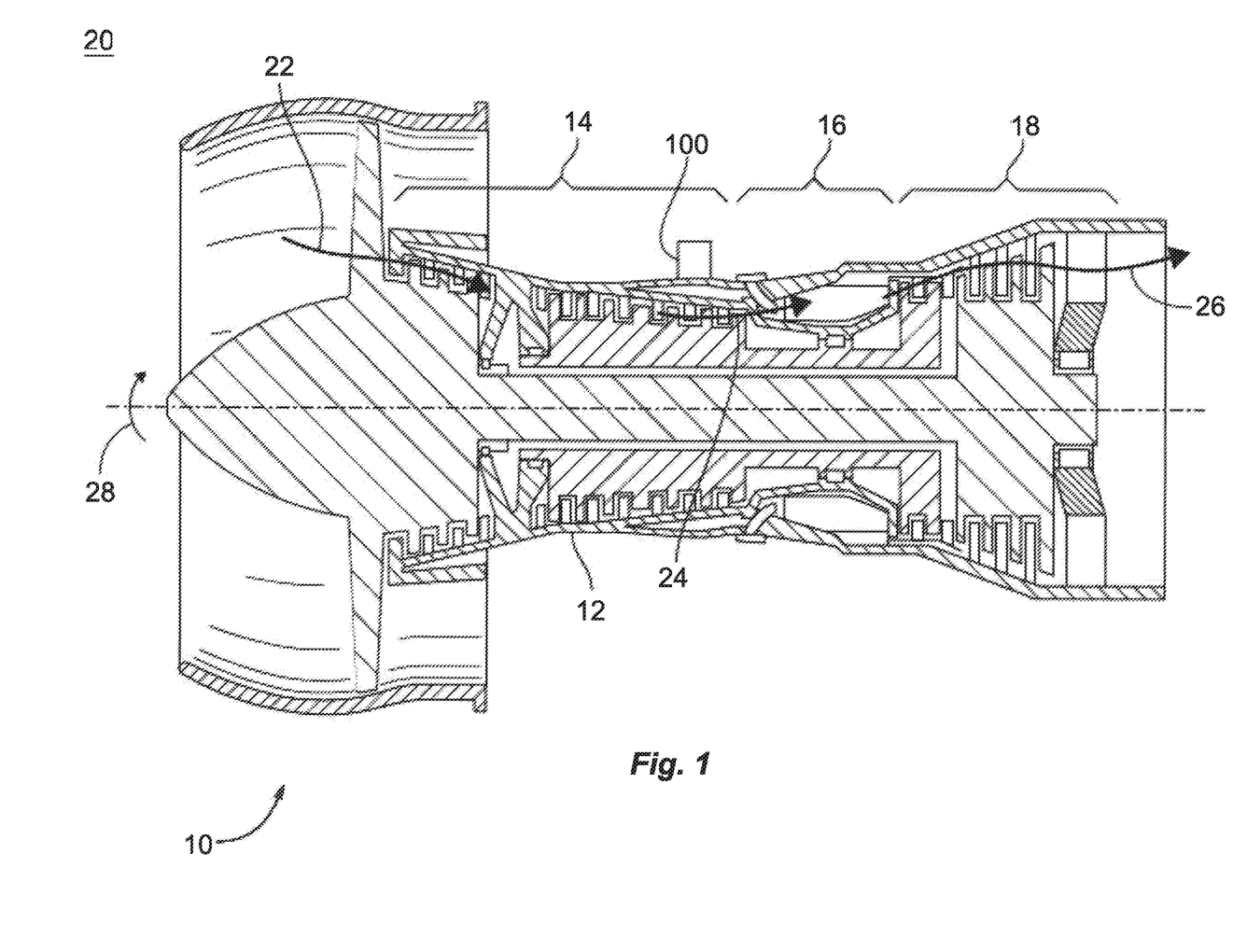
FIG. 1 is a schematic view of a gas turbine engine with a passively controlled inline bleed valve constructed in accordance with the present disclosure, showing the bleed valve.

Reference will now be made to the drawings wherein like reference numerals identify similar structural features or aspects of the subject disclosure. For purposes of explanation and illustration, and not limitation, a partial view of an exemplary embodiment of a bleed valve in accordance with the disclosure is shown in FIG. 1 and is designated generally by reference character 100. Other embodiments of bleed valves, compressors, gas turbine engines, and methods a controlling fluid flow through bleed valves in accordance with the disclosure, or aspects thereof, are provided in FIGS. 2-9, as will be described. The systems and methods described herein can be used for passively controlling inline bleed valves in gas turbine engines, though the present disclosure is not limited to gas turbine engines in general.

Referring to FIG. 1, a gas turbine engine 10 is shown. Gas turbine engine 10 includes case 12 containing a compressor section 14, a combustion section 16, and a turbine section 18. Compressor section 14 is disposed in fluid communication with external environment 20 and is arranged to compress fluid 22 ingested from external environment 20. Once compressed fluid 22 is communicated to combustion section 16 as a compressed fluid 24.

Combustion section 16 is disposed in fluid communication with compressor section 14, is arranged to receive therefrom compressed fluid 24, and generates high pressure combustion products 26 using compressed fluid 24 and fuel also provided to combustion section 16. High pressure combustion products 26 are provided by combustion section 16 to turbine section 18.

Turbine section 18 is disposed in fluid communication with combustion section 16 and is arranged to receive therefrom high pressure combustion products 26. Turbine section 18 expands high pressure combustion products 26 as high pressure combustion products 26 traverse turbine section 18, turbine section 18 extracting work 28 from high pressure combustion products 26 during expansion. A portion of work 28 is provided to compressor section 14 to provide the input power necessary to compress fluid 22 for generating compressed fluid 24, the amount of work corresponding the amount of fluid and extent of compression required for the operating state of gas turbine engine 10. Bleed valve 100 is connected to case 12 for reducing amount of work 28 provided to compressor section 14 according to the operating regime of gas turbine engine 10.

Figure 2:
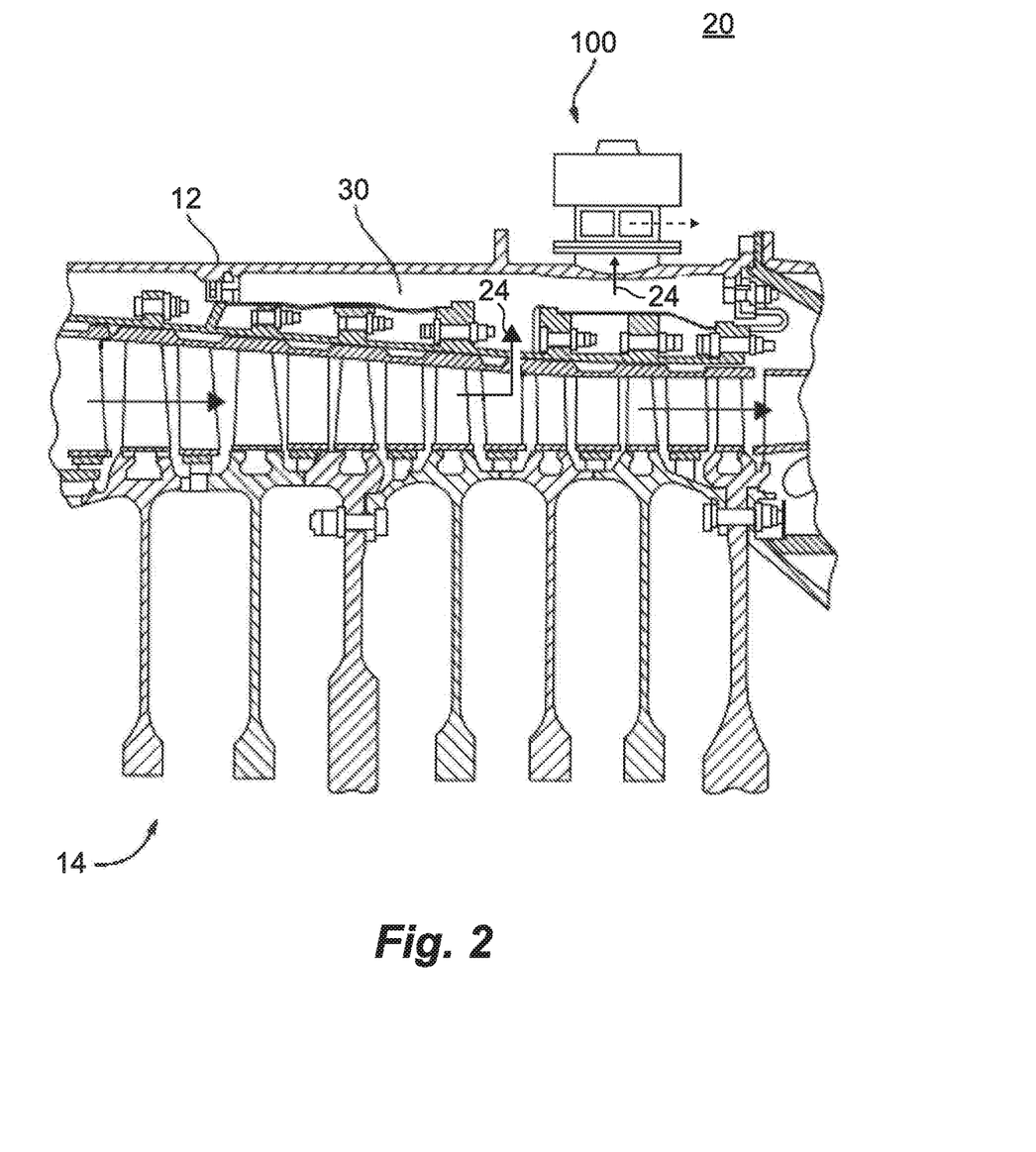
FIG. 2 is a schematic view of a portion the compressor section of the gas turbine engine of FIG. 1, showing the bleed valve passively placing the compressor section in fluid communication with external environment according to pressure differential within the bleed valve.
Figure 3A:
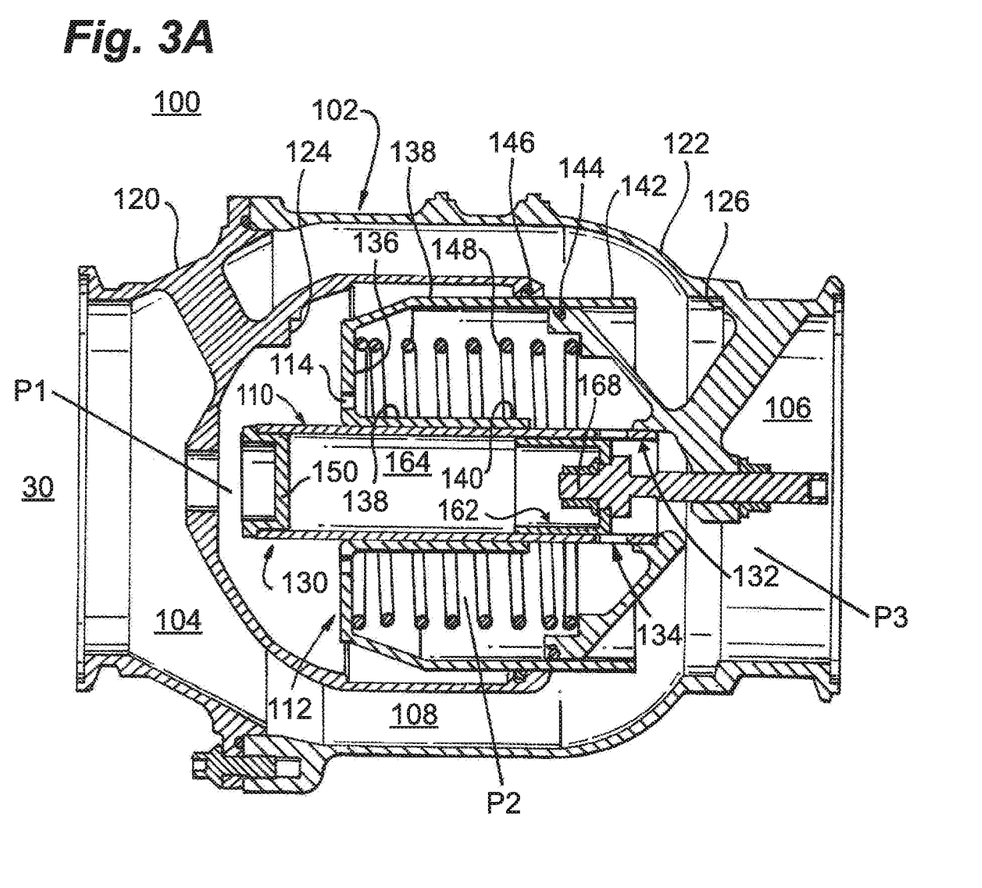
FIGS. 3A and 3B are a cross-sectional view and schematic flow area view of the bleed valve of FIG. 1, showing valve elements and selected flow area size relations, respectively.

With reference to FIGS. 2 and 3A, compressor section 14 and bleed valve 100 are shown. Bleed valve 100 is fixed to case 12 for selectively (shown with the dashed flow arrow in FIG. 2) venting compressor section 14 to external environment 20. Compressor section 14 includes a plenum 30 which is in fluid communication with the gas path through compressor section 14 and is occupied by compressed fluid 24. An inlet 104 of bleed valve 100 is in fluid communication with plenum 30 such that differential in pressure P1 at inlet 104 (shown in FIG. 3A) and pressure P3 at outlet 106 (shown in FIG. 3A) of bleed valve 100. Differential between pressure P1 of compressed fluid 24 and P3 at outlet 106, i.e., differential pressure P1-P3, is used to passively operate bleed valve 100.

Referring to FIG. 3A, bleed valve 100 includes a housing 102 with an inlet 104 coupled to an outlet 106 by a duct 108. Guide tube 110 with a guide tube orifice 134 is fixed in housing 102 between inlet 104 and outlet 106, a piston 112, and baffle 162. Piston 112 has a piston orifice 114, is slideably supported on guide tube 110, and is movable between an open position 116 (shown in FIG. 4) and a closed position 118 (shown in FIG. 5). Duct 108 fluidly couples inlet 104 with outlet 106 in open position 116. Duct 108 fluidly separates inlet 104 from outlet 106 in closed position 118. Guide tube orifice 134 and piston orifice 114 fluidly couple inlet 104 and outlet 106 in both open position 116 and closed position 118 to move piston 112 between open position 116 and closed position 118 according to differential pressure P1-P3 between bleed valve inlet 104 and outlet 106. Baffle 162 is slideably supported by guide tube 110 to set the differential pressure P1-P3 at which piston 112 moves between open position 116 and closed position 118. Outlet 106 can go to either the ambient environment or to a low pressure bypass flow stream, as suitable for an intended application.

Housing 102 has an inlet portion 120 and an outlet portion 122. Inlet portion 120 defines inlet 104, is sealably connected to outlet portion 122 on an end opposite of inlet portion 120 opposite (relative to a direction of flow through bleed valve 100) inlet 104, and has an open seat 124 arranged within an interior of inlet portion 120. Open seat 124 is configured to receive piston 112 when piston 112 is in open position 116 (shown in FIG. 4). Outlet portion 122 defines outlet 106 and fastens to inlet portion 120 on an end of outlet portion 122 opposite (relative to a direction of flow through bleed valve 100) inlet 104. A closed seat 126 is arranged with an interior of outlet portion 122 to receive and sealably seat piston 112 when piston 112 is in closed position 118. Connection of inlet portion 120 to outlet portion 122 can be with threaded fasteners or any other type of suitable fixation.

Guide tube 110 extends axially between inlet 104 and outlet 106 and has an inlet end 130, an outlet end 132, and a guide tube orifice 134. Outlet end 132 is seated in outlet portion 122 of housing 102. Guide tube orifice 134 is defined within guide tube 110 at a location between outlet end 132 and inlet end 130 and extends through a thickness of the wall defining guide tube 110. Inlet end 130 opposes inlet 104 on a side of guide tube orifice 134 opposite outlet end 132. An end cap 150 is seated on guide tube 110 facing inlet 104 separating an interior 164 of guide tube 110 from inlet 104. As shown in FIG. 3A guide tube orifice 134 is one of plurality of guide tube orifices 134 defined between inner and outer surfaces of guide tube 110.

Piston 112 is slidably seated on guide tube 110 and has a face 136 and a skirt 138. Face 136 opposes inlet 104. Skirt 138 extends from face 136 towards outlet 106 and has an inner portion 140 and an outer portion 142. Inner portion 140 extends about guide tube 110 and is in sliding engagement with an outer surface of guide tube 110. Outer portion 142 extends about inner portion 140 is sealably received between inlet portion 120 and outlet portion 122 of housing 102. Piston orifice 114 extends through piston face 136 to fluidly couple inlet 104 with a volume bounded by the downstream surface of face 136 and opposing faces of inner portion 140 and outer portion 142 of skirt 138. An inner sealing member 144 is seated within outer portion 122 of housing 102, extends about guide tube 110, and abuts an inner surface of outer portion 142 to prevent fluid flow therebetween. An outer sealing member 146 is seated within inlet portion 120 of housing 102, extends about skirt outer portion 142, and abuts an outer surface of skirt outer portion 142 to prevent fluid flow therebetween. Skirt 138 is slideably received between inner sealing member 144 and outer sealing member 146 to sealably move between open position 116 (shown in FIG. 4) and closed position 118 (shown in FIG. 5).

A biasing member 148 is arranged between piston 112 and housing 102. Biasing member 148 is arranged to exert a biasing force B (shown in FIG. 4) on piston 112, biasing force B urging piston 112 in the direction of inlet 104 and toward open seat 124. It is contemplated that biasing force B cooperate with pressure P2 to exert a chamber pressure force C (shown in FIG. 4) on piston 112. Biasing force B and chamber pressure force C cooperate to oppose a plenum fluid force P (shown in FIG. 4) exerted on piston 112 by compressed fluid 24 (shown in FIG. 1), plenum fluid force P always being equivalent to or greater than chamber pressure force C. Location of piston 112 within housing 102, e.g., open position 116 (shown in FIG. 4) and closed position 118 (shown in FIG. 5), is governed by equilibrium between biasing force B, chamber force C, and plenum fluid force P. As shown in FIG. 3A biasing member 148 includes a spring element arranged between an inner surface of piston face 136 and outlet portion 122 of housing 102. As will be appreciated by those of skill in the art in view of the present disclosure, other spring element arrangements and/or types of biasing elements can be used and remain within the scope of the present disclosure, as suitable for an intended application.

Figure 4:
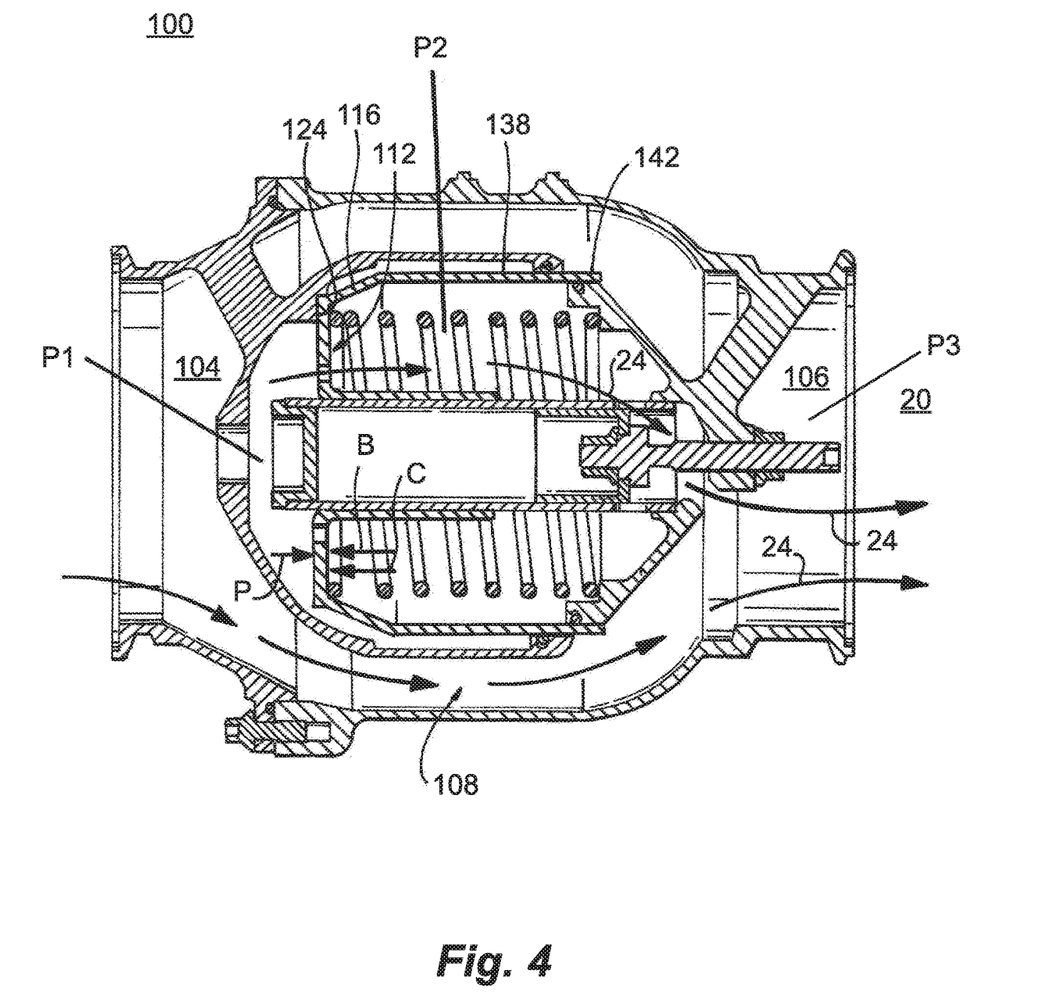
FIG. 4 is a cross-sectional view of the bleed valve of FIG. 1, showing the piston disposed at an open position such that the duct fluidly coupled the inlet to the outlet of the bleed valve.

Referring to FIG. 4, piston 112 is shown subsequent to movement to open position 116. In open position 116 piston 112 abuts open seat 124. Movement of piston 112 against open seat 124 such that piston 112 abuts open seat 124 withdraws skirt 138, and more particularly outer portion 142 of skirt 138, from duct 108. Withdrawal of skirt 138 causes duct 108 to fluidly couple inlet 104 with outlet 106, compressed fluid 24 thereby flowing through duct 108 such that pressurized fluid flows through bleed valve 100, venting plenum 30 to the external environment 20 or a low pressure bypass duct. Piston 112 remains in abutment with open seat 124 while differential pressure P1-P3 remains below the predetermined value. When differential pressure P1-P3 across bleed valve 100 exceeds the predetermined differential pressure valve piston 112 moves to closed position 118 (shown in FIG. 5).

Figure 5:
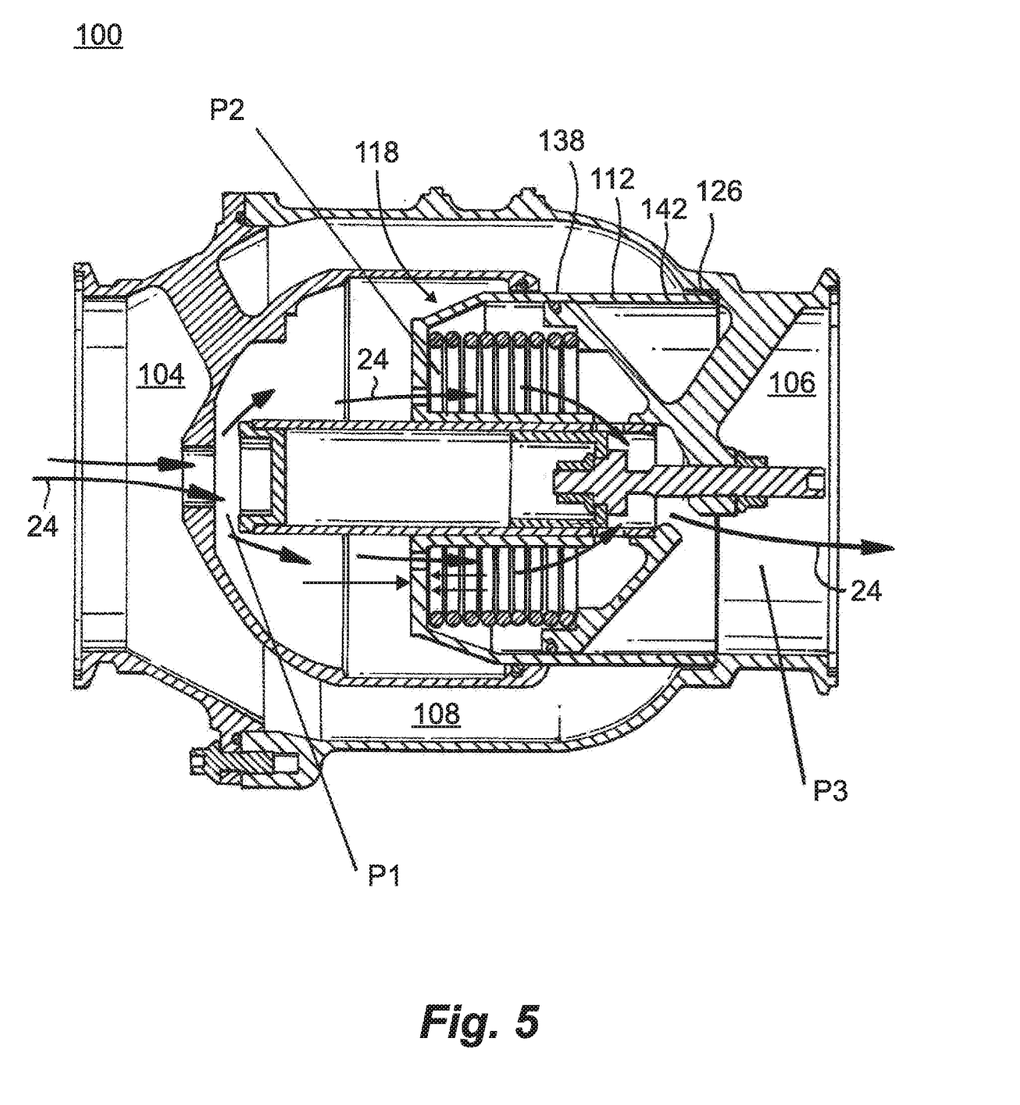
FIG. 5 is a schematic view of the bleed valve of FIG. 1, showing the piston disposed at an closed position such that the duct fluidly separates the inlet from the outlet of the bleed valve.

Referring to FIG. 5, piston 112 is shown subsequent to movement to closed position 118. In closed position 118 piston abuts closed seat 126. Movement of piston 112 such that piston 112 abuts closed seat 126 introduces skirt 138, and more particularly skirt outer portion 14, into duct 108. Insertion of skirt 138 into duct 108 in turn causes duct 108 to fluidly separate inlet 104 from outlet 106, substantially no compressed fluid 24 thereby passing between inlet 104 and outlet 106 through duct 108. It is contemplated that piston 112 remain in abutment with closed seat 126 while the differential pressure P1-P3 across bleed valve 100 remains above the predetermined value. In certain embodiments the predetermined value demarcates a transition between starting and steady-state operation of a compressor, e.g., compressor section 14 (shown in FIG. 1) of gas turbine engine 10 (shown in FIG. 1).

With continuing reference to FIG. 3A, when the pressure differential P1-P3 drops below a predetermined value, a piston 112 moves to an open position 116 (shown in FIG. 4). Movement of piston 112 to open position allows compressed fluid 24 to flow from plenum 30 to external environment 20 through a duct 108 within bleed valve 100. When the pressure differential P1-P3 rises above the predetermined value a piston 112 moves to a closed position 118 (shown in FIG. 5). Movement of piston 112 to closed position causes piston 112 to block duct 108 such that duct 108 fluidly separates outlet 106 from inlet 104.

In both closed position 118 (shown in FIG. 5) and open position 116 (shown in FIG. 4), as well as positions intermediate open position 116 and closed position 118, outlet 106 and inlet 104 are in fluid communication with one another through piston orifice 114 and guide tube orifice 134. Fluid communication through piston orifice 114 and guide tube orifice 134 causes compressed fluid 24 to flow through bleed valve 100 in both open position 116 and closed position 118, as shown with flow arrows passing through piston orifice 114 and guide tube orifice 134 in FIGS. 4 and 5. The flow causes chamber pressure P2 within piston 112 to vary according to pressure differential P1-P3, applicants appreciating that the benefit of a limited flow of compressed fluid 24 through bleed valve 100 while closed provides for passive operation outweighs the loss of compressed fluid 24 flowing through bleed valve 100 while bleed valve 100 is in closed position 118. This is because, as shown in FIG. 3B, the minimum flow areas (156/158) defined by piston orifice 114 and guide tube orifice 134 are relatively small in comparison to flow areas 154/152 of inlet 104 and outlet 106.

Figure 3B:
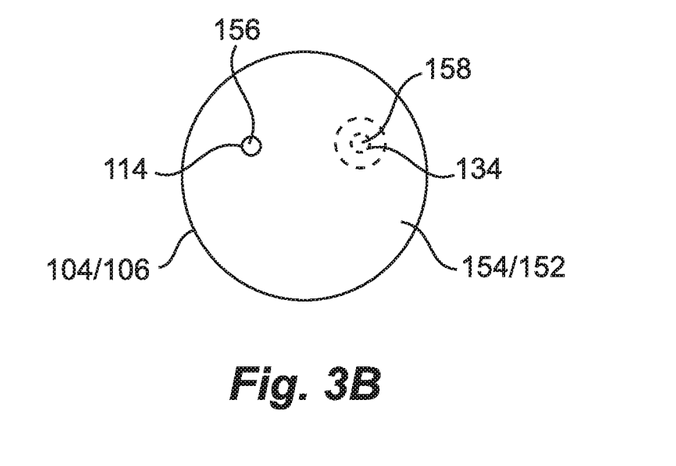
Figure 8:
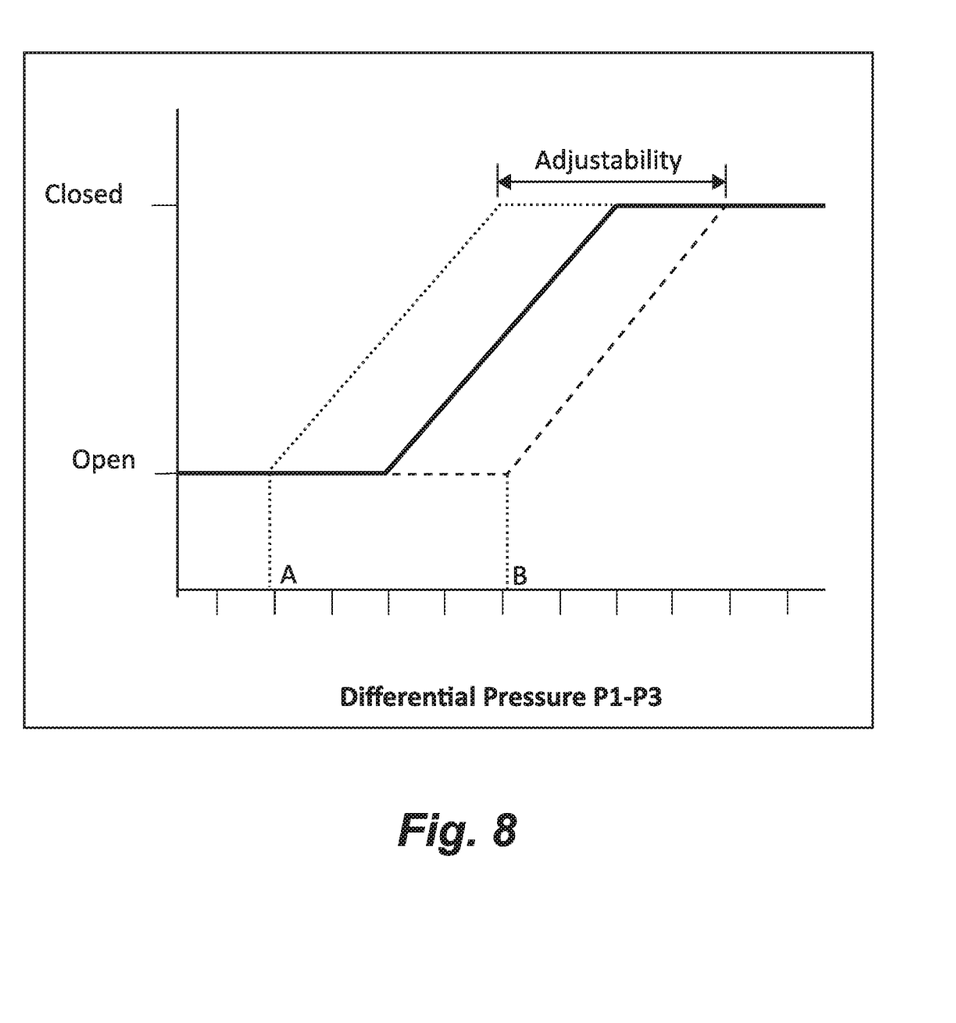

Referring to FIG. 3B and FIG. 8, the differential pressure P1-P3 at which piston 112 moves between open position 116 and closed position 118 is determined by the minimum flow area within an orifice network 114/116 including piston orifice 114 and guide tube orifice 134. In embodiments described herein flow area 158 of guide tube orifice 134 defines the minimum flow area within orifice network 114/116. Flow area 158 is in turn defined by the position of baffle 162 relative guide tube orifice 134, thereby providing adjustability according to flow area of guide tube orifice 134. This is illustrated schematically in FIG. 3B with the differential in relative size of flow area 158 within the dotted outline and dashed outline, which correspond to the adjustability range between open differential pressure thresholds A and B in FIG. 8. Although described as being a singular set differential pressure herein, it is to be understood and appreciated that the set differential pressure can include both an open differential pressure and a close differential pressure, as shown with the slope of the differential function shown in FIG. 8.

Figure 6:
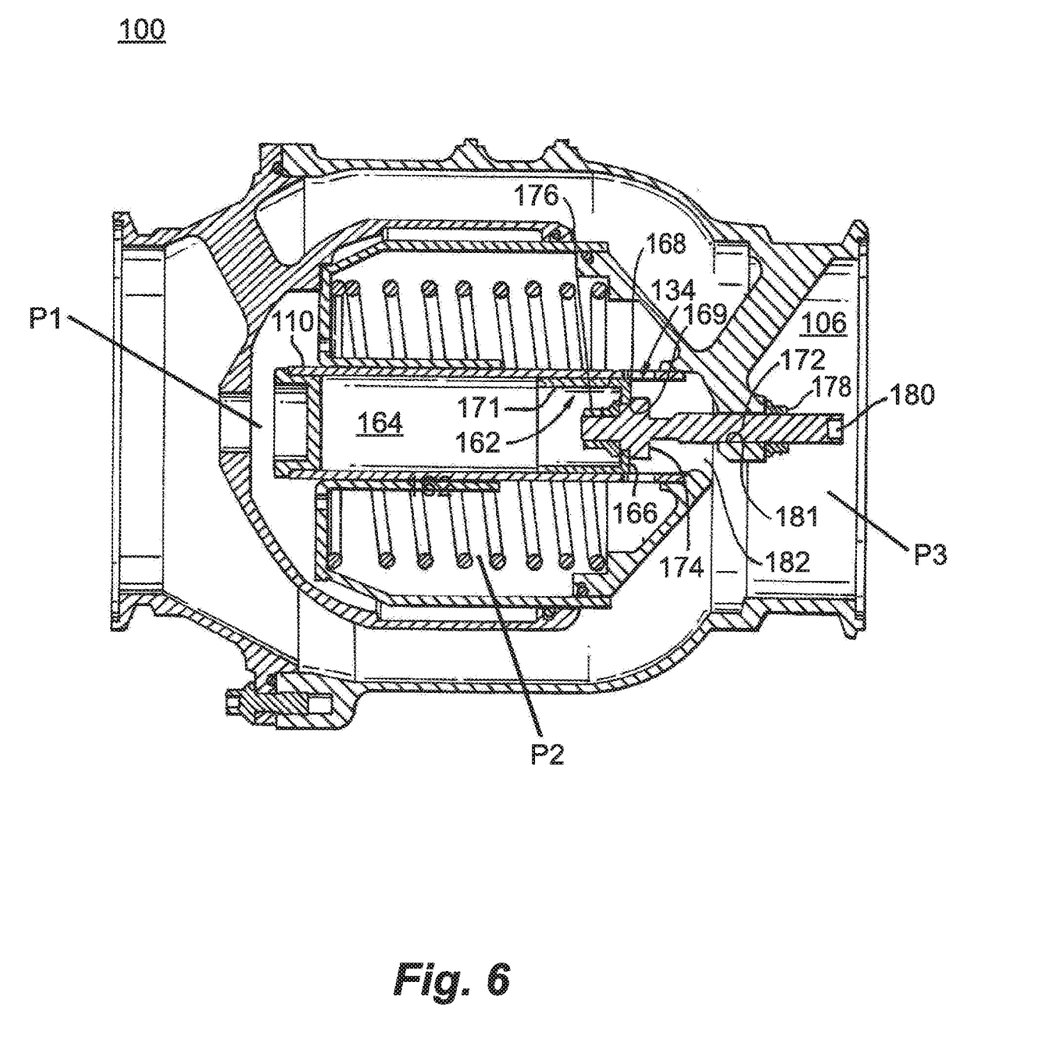
FIGS. 6-8 are cross-sectional views and an adjustability plot of the bleed valve of FIG. 1, showing a baffle disposed in first and second positions to provide adjustability of the differential pressure at which the bleed valve piston moves between the open and closed positions.
Figure 7:
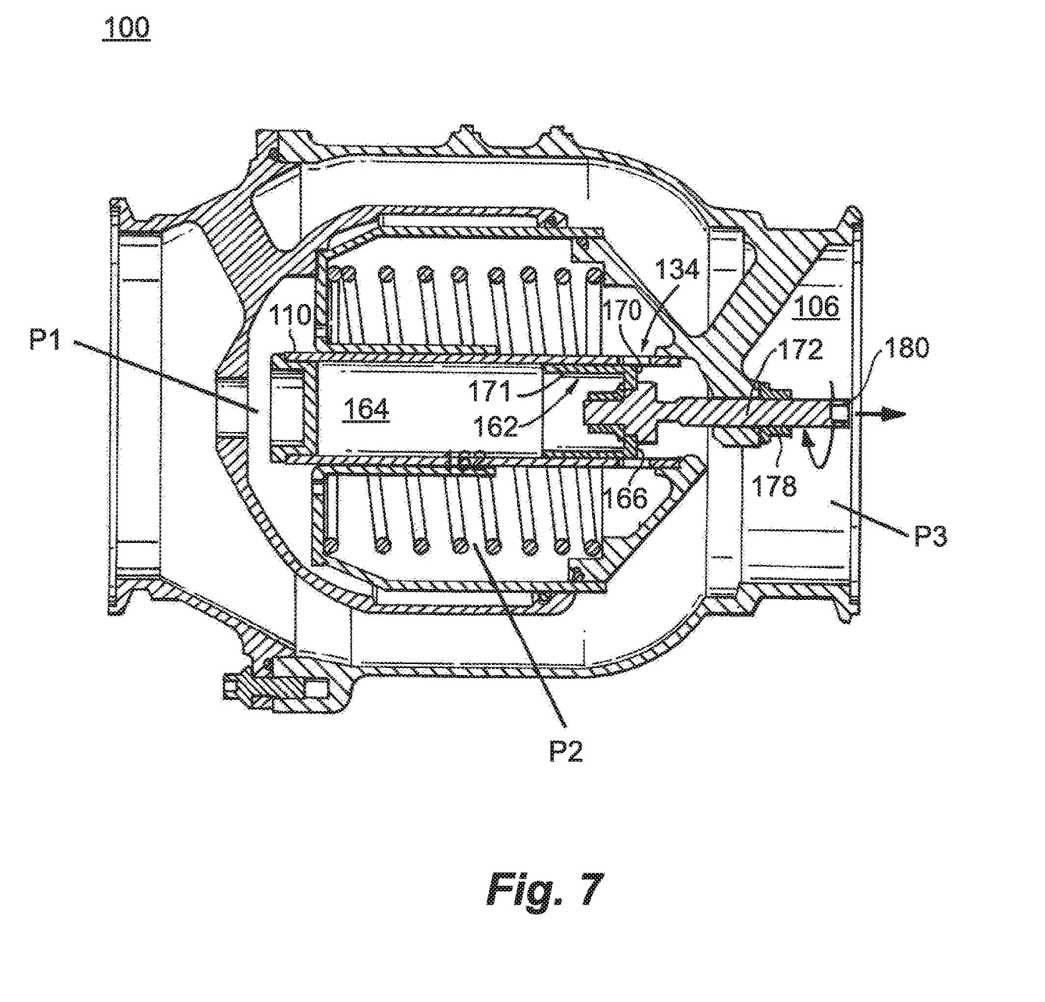

With reference to FIGS. 6 and 7, a set mechanism 164 for controlling position of baffle 162 relative to guide tube orifice 134 is shown. Baffle 162 has a face portion 166 with a set pin aperture 169 and a skirt portion 171, is slideably supported by guide tube 110, and is operably associated with set mechanism 164 to set the differential pressure P1-P3 at which piston 112 moves between open position 116 (shown in FIG. 4) and closed position 118 (shown in FIG. 5). In this respect baffle 162 extends circumferentially about an interior surface of guide tube 110 and has a first position 168 (shown in FIG. 6) and a second position 170 (shown in FIG. 7). Skirt portion 171 radially bounds guide tube orifices 134, which each extend axially along a portion of the length of guide tube 110, in either (or both) first position 168 and second position 170.

Flow area 158 (shown in FIG. 3B) of guide tube orifice 134 is larger in second position 170 (shown with the dashed outline bounding flow area 158 in FIG. 3B) than in first position 168 (shown with the dotted outline bounding flow area 158 in FIG. 3B). When baffle 162 is in first position 168 piston 112 moves between open position 116 (shown in FIG. 4) to closed position 118 (shown in FIG. 5) at differential pressure A (shown in FIG. 8). When baffle 162 is in second position 170 piston 112 moves between open position 116 and closed position 118 at differential pressure B. Operable connection of set mechanism 164 with baffle 162 allows for selection of differential pressure at which bleed valve 100 opens. This allows bleed valve 100 to be used on engines requiring actuation at different pressure differentials. It is contemplated that adjustability of baffle 112 be continuous, meaning that position of baffle 162 can be selected such bleed valve 100 moves between open position 116 and closed position 118 at any differential pressure between differential pressure A and differential B.

In the illustrated exemplary embodiment set mechanism 164 includes a set pin 172 with a flange 174, a collar 176, and a sleeve 178. Set pin 172 movably couples baffle to the housing for displacement of the baffle relative to the guide tube. Flange 174 extends about set pin 172 adjacent baffle 162 and fixes baffle 162 to set pin 172. Collar 176 threadably seats about an end of set pin 172 and fixes baffle 162 to set pin 172. Set pin 172 is in turn received within a set pin aperture 181 defined within housing 102, set pin 172 arranged between guide tube orifice 134 and housing aperture 182 fluidly coupling guide tube orifice 134 with outlet 106, and set pin 172 being free for rotation and axial movement (both shown with arrows in FIG. 7) within sleeve 178 and relative to housing 102 for setting differential pressure P1-P3. As will be appreciated by those of skill in the art in view of the present disclosure, this provide adjustability to bleed valve 100 by allowing differential pressure P1-P3 to be adjusted for needs of the particulate type (or serial number) of gas turbine engine. Physical adjustment can be accomplished, for example, via a tool engagement feature 180 arranged on an end of set pin 172 opposite baffle 162.

Figure 9:
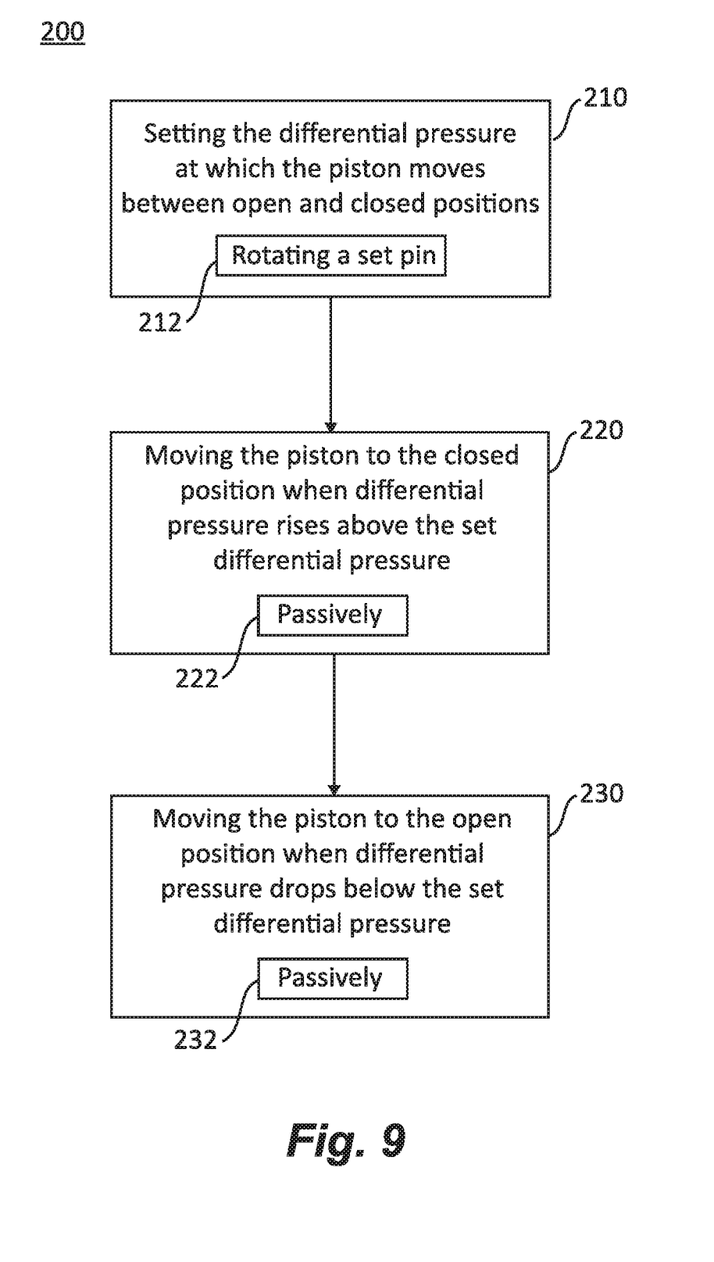
FIG. 9 is a method of setting differential pressure at which a bleed valve opens, showing steps of the method.

Referring now to FIG. 9, method 200 of controlling fluid flow through a bleed valve, e.g., bleed valve 100 (shown in FIG. 1), is shown. Method 200 includes setting the differential pressure between the inlet and the outlet of the bleed valve at which the piston moves between an open position and a closed position, e.g., differential pressure P-P3 (shown in FIG. 4), as shown with box 210. When the differential pressure rises above below the set differential pressure a piston of the bleed valve, e.g., piston 112 (shown in FIG. 3A), moves to the closed position, e.g., closed position 118 (shown in FIG. 5), as shown with box 220. This causes bleed valve duct 108 (shown in FIG. 3A) to fluidly separate inlet 104 (shown in FIG. 3A) from outlet 106 (shown in FIG. 3B). When the differential pressure drops below the set differential pressure the piston moves to the open position such that the duct fluidly couples the inlet to the outlet, as shown with box 230.

It is contemplated that movement between the open position and the closed position can be passive, i.e., without the employment of a solenoid or muscle force from a pressurized fluid source, as shown box 222 and 232. It is also contemplated that, in accordance with certain embodiments, that setting the differential pressure can include rotating a set pin, e.g., set pin 172 (shown in FIG. 7) connecting the baffle to the bleed valve housing, thereby changing flow area of the orifice, as shown with box 212.

Inline bleed valves for gas turbine engines are generally operated by a pneumatic controller. The pneumatic controller controls so-called muscle pressure to the inline bleed valve, applying the muscle pressure into a actuation chamber to actuate the inline bleed valve. While generally acceptable for their intended function such pneumatic controllers and actuation chambers can add complexity, mass, and/or size to the inline bleed valve.

In certain embodiments described herein passive inline bleed valves function solely according to the pressure at bleed valve inlet and outlet. In this respect the bleed valve can include an orifice network with orifices defined within the inline bleed valve and fluidly between the inlet and the outlet. By selecting suitable sizing of the orifice flow area internal leakage through the inline bleed valve and pressure within chambers defined within the inline bleed valve interior can be controlled, pressure within a chamber located fluidly downstream of the bleed valve piston balancing force on the piston from pressure within a chamber located fluidly upstream of the bleed valve piston. The net force on the piston is a function of the pressures on each side of the piston and pressure exerted on the piston by the biasing member, the amount of force exerted on the piston thus controlling valve actuation pressure.

The methods and systems of the present disclosure, as described above and shown in the drawings, provide for inline bleed valves with superior properties including passive control. Being passively controlled the inline bleed valves do not require an active control mechanism, such as a solenoid and/or a controller. This can reduce complexity, mass, and size of the bleed valve, potentially improving reliability and/or reducing cost. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A bleed valve, comprising:
a housing with an inlet coupled to an outlet by a duct;
a guide tube with an orifice fixed in the housing between the inlet and the outlet;
a piston slideably supported on the guide tube and movable between an open position and a closed position, the duct fluidly coupling the inlet to the outlet in the open position, the duct fluidly separating the inlet from the outlet in the closed position, wherein the orifice fluidly couples the inlet with the outlet in the open position and the closed position to move the piston between the open position and the closed position according to differential pressure between the inlet and the outlet of the bleed valve; and
a baffle slideably supported by the guide tube to set the differential pressure at which the piston moves between the open position and the closed position.

2. The bleed valve as recited in claim 1, wherein the baffle has a first position and a second position, forming a flow area through the orifice larger in the second position than in the first position, the baffle movable continuously between the first position and the second position to set the flow area through the orifice.

3. The bleed valve as recited in claim 1, wherein the baffle has a skirt portion overlapping a portion of the orifice in at least one of the first position and the second position.

4. The bleed valve as recited in claim 1, wherein the baffle has a face portion with a set pin aperture, the face portion arranged within an interior of the guide tube.

5. The bleed valve as recited in claim 1, further comprising a set pin movably coupling the baffle to the housing for displacement of the baffle relative to the guide tube.

6. The bleed valve as recited in claim 5, further comprising a collar connected to the set pin and fixing the baffle to the set pin.

7. The bleed valve as recited in claim 5, wherein the set pin has a flange arranged on the set pin adjacent the baffle and fixing the baffle to the set pin.

8. The bleed valve as recited in claim 5, wherein the set pin has a tool engagement feature arranged on an end of the set pin opposite the baffle.

9. The bleed valve as recited in claim 5, wherein the housing has a set pin aperture, the set pin received within the set pin aperture, the set pin free for rotation and axial movement relative to the housing for setting a predetermined differential pressure.

10. The bleed valve as recited in claim 9, further comprising a sleeve threadably seated in the set pin aperture, the set pin received within the sleeve.

11. The bleed valve as recited in claim 10, wherein the set pin is threadably coupled to the sleeve for rotation and displacement relative to the sleeve when moving between a first position and a second position.

12. The bleed valve as recited in claim 1, wherein the baffle extends circumferentially about an interior of the guide tube.

13. The bleed valve as recited in claim 1, wherein the orifice comprises a plurality of axially extending slots, the baffle overlapping the plurality of axially extending slots in at least one of a first position and a second position.

14. The bleed valve as recited in claim 1, wherein the housing has a housing aperture defined in the housing and fluidly coupling the orifice with the outlet by a set pin disposed between the orifice and the housing aperture.

15. A gas turbine engine, comprising:
a compressor with a plenum;
a turbine operably connected to the compressor; and
a bleed valve as recited in claim 1 coupling the plenum with an external environment, wherein the bleed valve comprises a set pin movably coupling the baffle to the housing for displacement of the baffle relative to the guide tube, wherein the set pin is threadably coupled to the housing for rotation and displacement relative to a sleeve to set the differential pressure.

16. The gas turbine engine as recited in claim 15, wherein the housing has a housing aperture fluidly coupling the orifice with the outlet, the set pin arranged between the orifice and the housing aperture.

* * * * *